US011956501B2

(12) United States Patent
Besehanic

(10) Patent No.: US 11,956,501 B2
(45) Date of Patent: *Apr. 9, 2024

(54) METHODS, APPARATUS, AND MACHINE-READABLE STORAGE MEDIA TO MONITOR A MEDIA PRESENTATION

(71) Applicant: The Nielsen Company (US), LLC, New York, NY (US)

(72) Inventor: Jan Besehanic, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,425

(22) Filed: Feb. 3, 2023

(65) Prior Publication Data

US 2023/0188784 A1 Jun. 15, 2023

Related U.S. Application Data

(63) Continuation of application No. 17/344,620, filed on Jun. 10, 2021, now Pat. No. 11,601,714, which is a (Continued)

(51) Int. Cl.
*H04N 21/442* (2011.01)
*G06Q 30/02* (2023.01)
(Continued)

(52) U.S. Cl.
CPC ....... *H04N 21/44213* (2013.01); *G06Q 30/02* (2013.01); *H04H 20/57* (2013.01);
(Continued)

(58) Field of Classification Search
CPC ....... H04N 21/25841; H04N 21/41407; H04N 21/42203; H04N 21/4394;
(Continued)

(56) References Cited

U.S. PATENT DOCUMENTS 3,936,594 A 2/1976 Schubin
4,230,990 A 10/1980 Lert, Jr.
(Continued)

OTHER PUBLICATIONS

United States Patent and Trademark Office, "Non-Final Office Action" issued in connection with U.S. Appl. No. 13/436,444, dated Jun. 7, 2016, (19 pages).
(Continued)

*Primary Examiner* — John M Macilwinen

(57) ABSTRACT

Methods, apparatus, and machine-readable storage media to monitor media presentations are disclosed. A disclosed example apparatus includes a locator to compare a location of a mobile device with a set of reference locations at which audio monitoring is to be performed. The disclosed example apparatus further includes an audio receiver to enable a microphone of the mobile device to collect audio for media monitoring when (1) the location of the mobile device corresponds to a first one of the reference locations and (2) a media presentation monitor at the first one of the reference locations indicates a likelihood of media being presented at the first location satisfies a threshold. In some disclosed examples, the audio receiver of the example apparatus is to disable the microphone from collecting audio for media monitoring when the location of the mobile device does not correspond to any of the reference locations.

7 Claims, 14 Drawing Sheets

Related U.S. Application Data continuation of application No. 16/261,281, filed on Jan. 29, 2019, now Pat. No. 11,039,208, which is a continuation of application No. 13/436,444, filed on Mar. 30, 2012, now Pat. No. 10,200,751.

(51) Int. Cl.

| | | |
|---|---|---|
| *H04H 20/57* | (2008.01) | |
| *H04H 60/31* | (2008.01) | |
| *H04H 60/37* | (2008.01) | |
| *H04H 60/58* | (2008.01) | |
| *H04N 21/258* | (2011.01) | |
| *H04N 21/414* | (2011.01) | |
| *H04N 21/422* | (2011.01) | |
| *H04N 21/439* | (2011.01) | |
| *H04N 21/44* | (2011.01) | |

(52) U.S. Cl.
CPC ............ *H04H 60/31* (2013.01); *H04H 60/37* (2013.01); *H04H 60/58* (2013.01); *H04N 21/25841* (2013.01); *H04N 21/41407* (2013.01); *H04N 21/42203* (2013.01); *H04N 21/4394* (2013.01); *H04N 21/44008* (2013.01); *H04N 21/44222* (2013.01)

(58) Field of Classification Search
CPC ....... H04N 21/44213; H04N 21/44222; H04H 60/31; H04H 20/57
See application file for complete search history.

(56) References Cited

U.S. PATENT DOCUMENTS

| | | | |
|---|---|---|---|
| 4,626,904 A | 12/1986 | Lurie | |
| 4,695,879 A | 9/1987 | Weinblatt | |
| 4,718,106 A | 1/1988 | Weinblatt | |
| 4,931,865 A | 6/1990 | Scarampi | |
| 4,955,070 A | 9/1990 | Welsh | |
| 5,235,414 A | 8/1993 | Cohen | |
| 5,945,988 A | 8/1999 | Williams | |
| 6,467,089 B1 | 10/2002 | Aust | |
| 7,180,863 B1 | 2/2007 | Bauer | |
| 7,222,071 B2 | 5/2007 | Neuhauser | |
| 8,514,907 B2* | 8/2013 | Wright | H04N 21/44209 463/40 |
| 8,948,895 B2* | 2/2015 | Weiss | G06F 16/683 725/18 |
| 10,200,751 B2* | 2/2019 | Besehanic | H04H 60/58 |
| 11,039,208 B2* | 6/2021 | Besehanic | G06Q 30/02 |
| 11,601,714 B2* | 3/2023 | Besehanic | H04N 21/41407 |
| 2002/0124077 A1 | 9/2002 | Hill | |
| 2003/0171833 A1 | 9/2003 | Crystal | |
| 2004/0064319 A1 | 4/2004 | Neuhauser | |
| 2005/0130634 A1* | 6/2005 | Godfrey | H04W 4/023 455/414.1 |
| 2005/0144632 A1 | 6/2005 | Mears | |
| 2006/0041653 A1 | 2/2006 | Aaron | |
| 2006/0079202 A1 | 4/2006 | Doan | |
| 2007/0226760 A1 | 9/2007 | Neuhauser | |
| 2007/0294705 A1 | 12/2007 | Gopalakrishnan | |
| 2008/0059988 A1* | 3/2008 | Lee | H04N 21/44218 725/9 |
| 2008/0155583 A1 | 6/2008 | Falcon | |
| 2008/0159547 A1 | 7/2008 | Schuler | |
| 2008/0263579 A1 | 10/2008 | Mears | |
| 2008/0270172 A1 | 10/2008 | Luff | |
| 2009/0063279 A1 | 3/2009 | Ives | |
| 2009/0233715 A1 | 9/2009 | Ergen | |
| 2009/0253406 A1 | 10/2009 | Fitzgerald | |
| 2010/0115573 A1 | 5/2010 | Srinivasan | |
| 2010/0142725 A1 | 6/2010 | Goldstein | |
| 2010/0240297 A1 | 9/2010 | Jones | |
| 2011/0275311 A1 | 11/2011 | Buehler | |
| 2011/0275312 A1* | 11/2011 | Buehler | H04H 60/66 455/3.06 |
| 2011/0313849 A1 | 12/2011 | Brueck | |
| 2012/0021773 A1 | 1/2012 | Lee | |
| 2012/0219156 A1* | 8/2012 | Ramaswamy | H04N 21/44213 381/56 |
| 2013/0093627 A1* | 4/2013 | Cosman | G01S 5/01 342/451 |

OTHER PUBLICATIONS

United States Patent and Trademark Office, "Final Office Action," issued in U.S. Appl. No. 16/261,281, dated Jun. 30, 2020, 13 pages.

United States Patent and Trademark Office, "Non-Final Office Action," issued in U.S. Appl. No. 16/261,281, dated Feb. 25, 2020, 12 pages.

United States Patent and Trademark Office, "Notice of Allowance," issued in U.S. Appl. No. 16/261,281, dated Feb. 18, 2021, 7 pages.

United States Patent and Trademark Office, "Notice of Allowance and Fee(s) Due," mailed in connection with U.S. Appl. No. 17/344,620, dated Nov. 2, 2022, 6 pages.

United States Patent and Trademark Office, "Non-Final Office Action," mailed in connection with U.S. Appl. No. 17/344,620, dated Mar. 7, 2022, 21 pages.

United States Patent and Trademark Office, "Advisory Action," mailed in connection with U.S. Appl. No. 17/344,620, dated Sep. 14, 2022, 3 pages.

United States Patent and Trademark Office, "Advisory Action," mailed in connection with U.S. Appl. No. 13/346,444, dated Mar. 28, 2017, 3 pages.

United States Patent and Trademark Office, "Final Office Action," mailed in connection with U.S. Appl. No. 17/344,620, dated Jun. 30, 2022, 6 pages.

Nottingham, "Optimising Web Services with Intermediaries", Apr. 17, 2001, http://www.mnol.net/papers/ws-optimisation.html, (6 pages).

United States Patent and Trademark Office, "Non-Final Office Action" issued in connection with U.S. Appl. No. 13/436,444, dated Sep. 28, 2017, (36 pages).

United States Patent and Trademark Office, "Notice of Allowance and Fee(s) Due" issued in connection with U.S. Appl. No. 13/436,444, dated Oct. 3, 2018, (11 pages).

United States Patent and Trademark Office, "Final Office Action" issued in connection with U.S. Appl. No. 16/261,281, dated Jun. 20, 2020, (13 pages).

United States Patent and Trademark Office, "Final Office Action" issued in connection with U.S. Appl. No. 13/436,444, dated Dec. 16, 2016, (25 pages).

United States Patent and Trademark Office, "Final Office Action" issued in connection with U.S. Appl. No. 13/436,444, dated May 3, 2018, (33 pages).

United States Patent and Trademark Office, "Final Office Action" issued in connection with U.S. Appl. No. 13/436,444, dated Dec. 19, 2014, (17 pages).

United States Patent and Trademark Office, "Final Rejection," issued in connection with U.S. Appl. No. 17/344,620, dated Jun. 10, 2021, 6 pages.

United States Patent and Trademark Office, "Non-Final Office Action" issued in connection with U.S. Appl. No. 13/436,444, dated Aug. 15, 2014, (13 pages).

\* cited by examiner

METHODS, APPARATUS, AND MACHINE-READABLE STORAGE MEDIA TO MONITOR A MEDIA PRESENTATION

RELATED APPLICATIONS

This patent arises from a continuation of U.S. patent application Ser. No. 17/344,620, filed on Jun. 10, 2021, entitled "METHODS, APPARATUS, AND MACHINE READABLE STORAGE MEDIA TO MONITOR A MEDIA PRESENTATION", which is a continuation of U.S. patent Ser. No. 16/261,281, filed Jan. 29, 2019, now U.S. Pat. No. 11,039,208, which is a continuation of U.S. patent application Ser. No. 13/436,444, filed Mar. 30, 2012, now U.S. Pat. No. 10,200,751. Priority to U.S. patent application Ser. No. 17/344,620 and U.S. patent application Ser. No. 16/261,281 and U.S. patent application Ser. No. 13/436,444 is hereby claimed. U.S. patent application Ser. Nos. 17/344,620; 16/261,281; 13/436,444 are hereby incorporated by reference in their entirety.

FIELD OF THE DISCLOSURE

This disclosure relates generally to audience measurement and, more particularly, to methods, apparatus, and machine readable storage media to monitor a media presentation.

BACKGROUND

Audience measurement involves the statistical analysis of audience composition for the presentations of media. Some mobile devices are used to collect information that is used to perform audience measurement analysis, because such devices are becoming more popular and are often carried by users.

DETAILED DESCRIPTION

Figure 1:
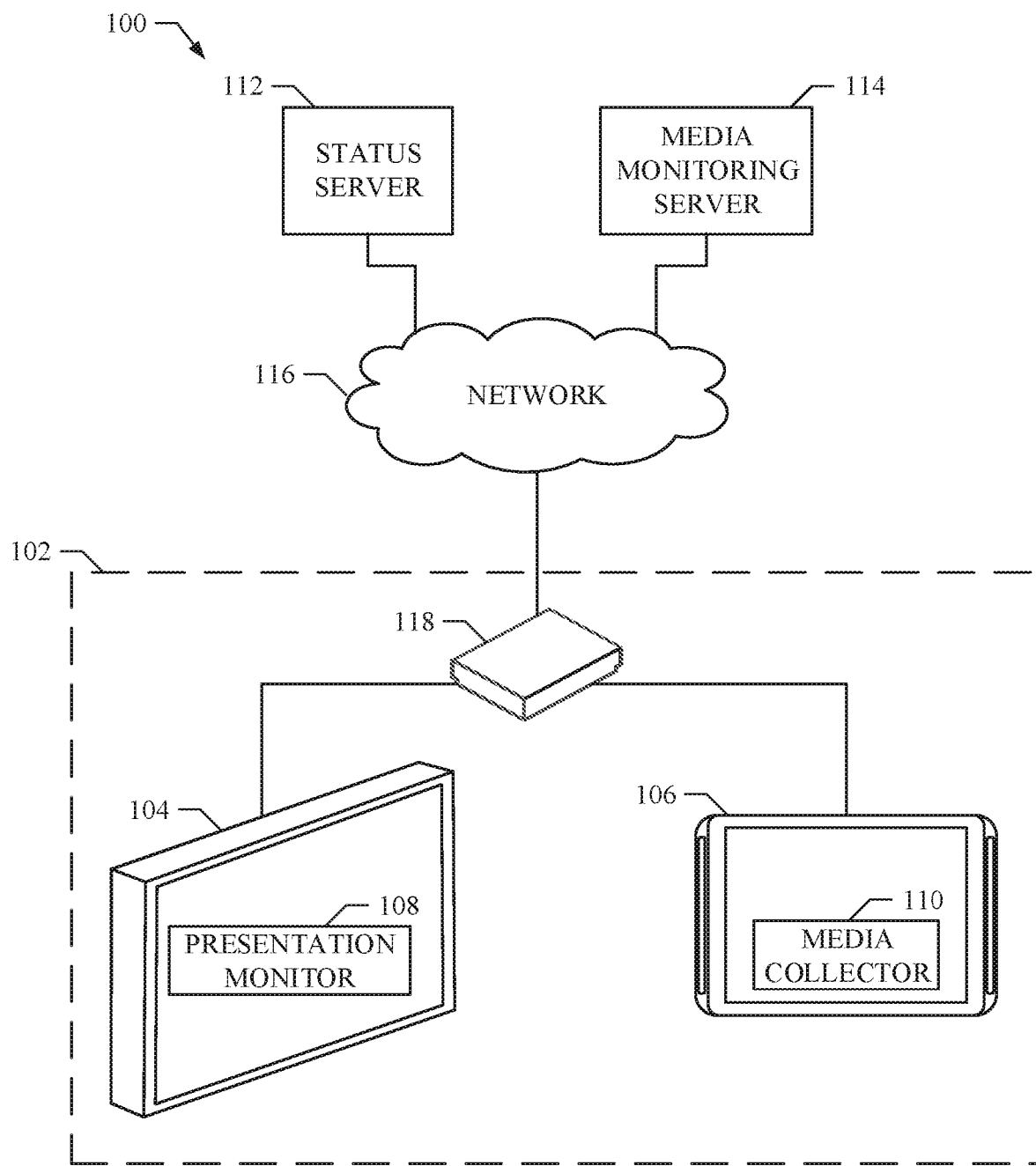
FIG. 1 illustrates an example system constructed in accordance with the teachings of this disclosure to monitor media presentation, in which a media presentation device includes a presentation monitor.

Example methods, apparatus, and/or machine readable storage media disclosed herein may be used to monitor the presentation of media. The presentation of media often includes the output of audio from a media presentation device (e.g., a television, a radio, a home theater system, a tablet, a smartphone, etc.). The audio may be collected by any device that includes a microphone and is within range of the audio output. Due to the proliferation of mobile devices, such as smartphones and tablets (e.g., an Apple® iPad®), and the frequency with which the users of such devices have them in their possession, measurement may be improved by using mobile devices to collect audio. However, software to enable the collection of audio via smartphones can adversely affect battery life of the mobile devices. For instance, enabling a mobile device microphone to capture audio for an extended time period, and/or processing and storing such collected audio causes a substantial drain on the mobile device's battery. This drain reduces the amount of time the device can be used between charging.

Example methods, apparatus, and/or articles of manufacture disclosed herein reduce the adverse effect of collecting audio on the battery life of mobile devices. In some disclosed examples, a mobile device determines a status of media presentation at a first location, collects audio when the status indicates a likelihood of media presentation at the first location, and does not collect audio when the status indicates no likelihood of media presentation.

Some example methods, apparatus, and/or articles of manufacture disclosed herein include a presentation monitor to determine whether there is a likelihood of media being presented at a first location, and to update a status at a status server to indicate the likelihood of media being presented. In some examples, the presentation monitor also updates the status to the status server when the presentation monitor determines that there is a low or no likelihood that media is being presented at the location. A status server maintains the status of media presentation for the first location, and provides the status to a media collector periodically, aperiodically, continuously, at predetermined times, in response to an event, and/or on demand.

In some examples, a mobile device includes a media collector. Example media collectors include an application to collect audio or to otherwise collect representations of presented media on a mobile device. In some examples, the mobile device receives (e.g., from a status server) an indication that media is being presented at a first location before (e.g., as a pre-condition to) the mobile device collecting the audio. In some examples, the mobile device determines a location of the mobile device and, when the mobile device is near the first location (e.g., has substantially the same location as the first location, is close enough to the first location to detect or capture audio being presented at the first location, etc.), the mobile device receives the status from the status server. When the status indicates a likelihood of media being presented at the first location, the mobile device begins collecting audio. On the other hand, when the status indicates there is a low or no likelihood of media being presented, the mobile device does not collect audio.

As used herein, the terms "having a likelihood", "more than a sufficient likelihood" and/or "sufficient likelihood" refer to a likelihood being greater than a non-zero threshold. Conversely, the terms "insufficient likelihood", "not having a likelihood," "having no likelihood," and/or "having low likelihood" refer to the likelihood being less than a threshold, which may be zero or non-zero.

FIG. 1 illustrates an example system 100 to monitor media presentation. The example system 100 of FIG. 1 may be used to perform audience measurement by collecting audio being presented at a first location 102. In the illustrated example of FIG. 1, the first location 102 is a room of a household (e.g., a "Nielsen family") that has been statistically selected for monitoring for the purpose of developing ratings data (e.g., television ratings, radio ratings, Internet ratings, etc.) for one or more populations/demographics of interest. For example, audience measurement services (e.g., Nielsen Cross-Platform Measurement) statistically select panelist households for measurement of television, online, and/or other types of content viewing. One or more persons of the household may have registered with the system (e.g., by agreeing to be a panelist) and may have provided their demographic information as part of the registration. The selected panelists' in-home and/or out-of-home viewing are measured to obtain ratings and/or other viewership information.

The example of FIG. 1 includes a media presentation device 104 and a mobile device 106. In the example of FIG. 1, the media presentation device 104 and the mobile device 106 are associated with the first location 102. For example, the media presentation device 104 and the mobile device 106 may be owned by a panelist, where the first location is the panelist's household or a portion of the household. The example media presentation device 104 of FIG. 1 may be a television (e.g., a smart television, an Internet-connected television, a television capable of executing software instructions, etc.), a personal computer (including, for example, notebook computers, netbook computers, and/or any other subtype of computing device), a tablet computer (e.g., an Apple® iPad®), a radio, a stereo, a game console, an optical disk player (e.g., a DVD player, a Blu-ray player, etc.) and/or any other past, present, and/or future media presentation devices.

In the example system 100 of FIG. 1, the media presentation device 104 includes a presentation monitor 108 that monitors a likelihood of whether the media presentation device 104 is presenting media. The presentation monitor 108 may be implemented using a software application executing on the media presentation device 104. In some examples, the presentation monitor 108 is implemented in a media presentation application (e.g., a Netflix application, etc.). In some other examples, the presentation monitor 108 is included as a separate application (e.g., an application downloadable from an online application store such as, for example, the Apple® iTunes® App Store, the Google Android Market™) and/or implemented in an operating system of the media presentation device 104 (e.g., part of the media presentation device 104 at the time of sale, downloaded to the device as a software and/or firmware update, etc.). In some examples, the presentation monitor 108 is incapable of identifying the presented media (e.g., the presentation monitor 108 detects that media is being presented, but does not identify the media being presented).

The example mobile device 106 of FIG. 1 may be a mobile phone, such as a smartphone or any other type of mobile phone on which software can be installed and executed. In some other examples, the mobile device 106 is a portable media device (e.g., an iPod®), a personal digital assistant (PDA), and/or any other type of portable or mobile device that can be used to collect audio. The example mobile device 106 of FIG. 1 includes a media collector 110. The media collector 110 of FIG. 1 receives a status indicating whether there is a likelihood of media being presented at the first location 102. When the status indicates that there is a sufficient likelihood of media being presented, the example media collector 110 collects audio. On the other hand, when the status indicates there is an insufficient likelihood of media being presented at the first location 102, the media collector 110 does not collect audio (e.g., the collector 110 remains in a low power and/or an idle state).

The example system 100 of FIG. 1 further includes a status server 112 and a media monitoring server 114. In the example of FIG. 1, the status server 112 and the media monitoring server 114 are communicatively coupled to the media presentation device 104 and/or to the mobile device 106 via a network 116 such as the Internet. The status server 112 receives status updates from the presentation monitor 108 via the network 116. The status updates are indicative of when the first location 102 has a sufficient likelihood of media being presented to merit data collection. The media collector 110 receives the status updates based on, for example, the location of the mobile device 106. Upon receiving the status update, the media collector 110 determines whether to start, not start, stop, and/or continue collecting audio. When the media collector 110 collects audio, the media collector 110 provides the audio to the media monitoring server 114 (e.g., via the network 116).

As mentioned above, the example media collector 110 may receive the status update from the status server 112 when the mobile device 106 is at the first location 102 (e.g., substantially the same location as the media presentation device 104). To determine the location of the mobile device 106, the example media collector 110 may determine whether the mobile device 106 is connected to the same local area network (LAN) as the media presentation device 104 and/or the presentation monitor 108. To this end, the example system 100 may include a router 118, such as a wireless network router that enables network communication via wired and/or wireless communications. In some other examples, the media collector 110 may determine a location of the mobile device 106 using Global Positioning System (GPS) information, cellular and/or WiFi triangulation information, and/or any other method of determining a location of the mobile device 106 (e.g., requests the user to identify their location by, for example, manually entering the same, selecting from a list of locations, etc.).

When the media collector 110 of FIG. 1 determines that the mobile device 106 is connected to the router 118 (e.g., connected to the same LAN as the media presentation device 104 and/or the presentation monitor 108), the media collector 110 of the illustrated example determines that the mobile device 106 is in the first location 102. The example media collector 110 of FIG. 1 polls the status server 112 for the status of the media presentation device 104 associated with the determined location and/or time of day. If the status indicates a likelihood that the media presentation device 104 is presenting media content, the example media collector 110 begins or continues collecting audio.

The example media collector 110 of FIG. 1 transmits collected audio and/or a representation of the collected audio (e.g., a hash of the collected audio, a signature describing the collected audio, an identification code embedded in the audio, etc.) to the media monitoring server 114 (e.g., via the network 116). In some examples, the media collector 110 identifies the media being presented based on the collected audio, and transmits an identification of the media to the media monitoring server 114. As used herein, the identification of the media includes information that is inserted in the media for the purpose of identifying the media (e.g., watermarks, codes, etc.) and/or includes information inherent to one or more aspects of the media (e.g., the audio, etc.) or to one or more aspects of the signal representing the media, which inherent information identifies the media (e.g., signatures, fingerprints, etc.).

Figure 2:
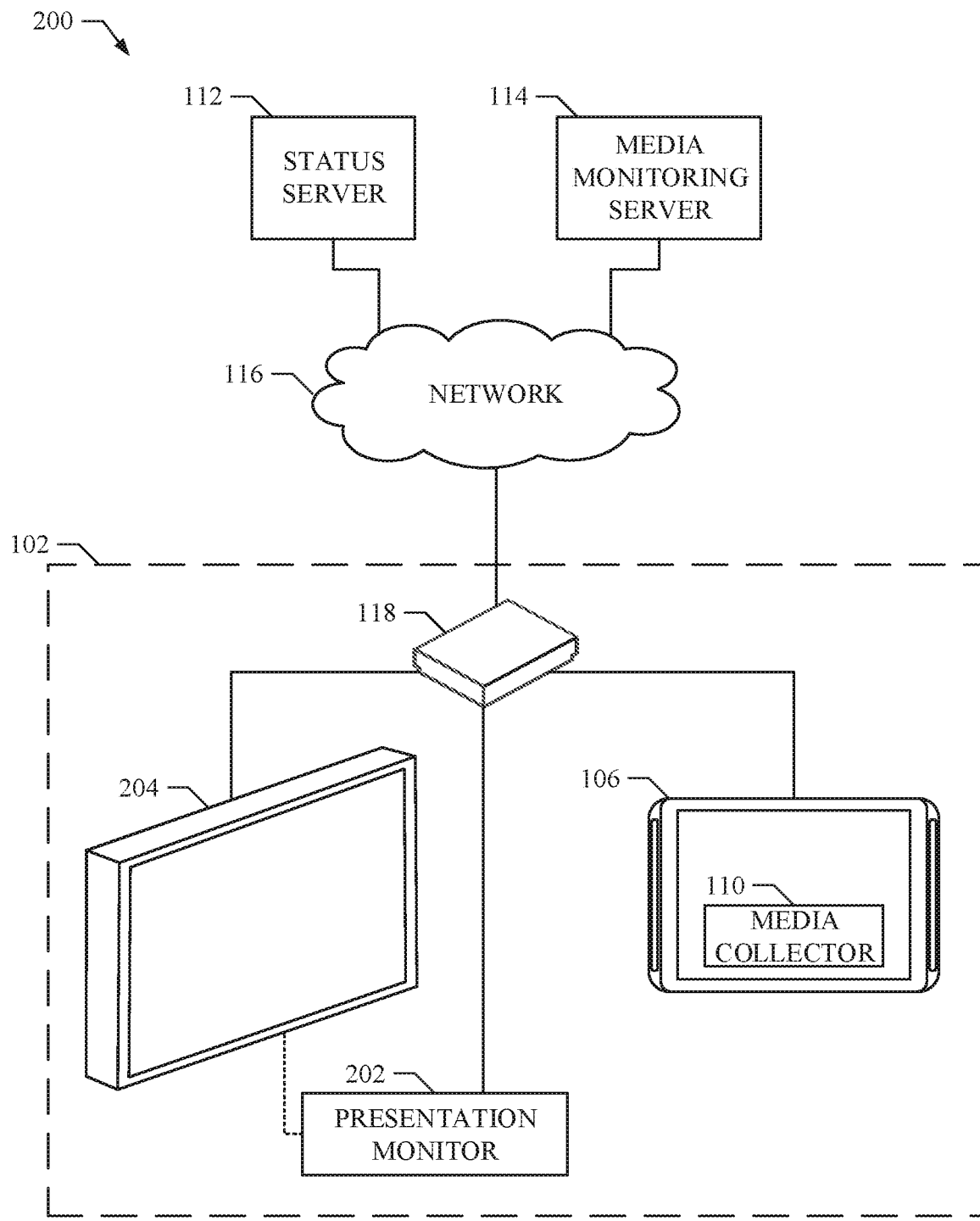
FIG. 2 illustrates another example system constructed in accordance with the teachings of this disclosure to monitor media presentation, in which a presentation monitor is external to a media presentation device.

FIG. 2 illustrates another example system 200 to monitor media presentation in accordance with the teachings of this disclosure. The example system 200 may be used to perform audience measurement by collecting audio being presented at the first location 102 or any other location of the mobile device 106. The example of FIG. 2 includes the example first location 102, the example mobile device 106, the example media collector 110, the example status server 112, the example media monitoring server 114, the example network 116, and the example router 118 of FIG. 1. However, the example system 200 differs from the system 100 of FIG. 1 in that a presentation monitor 202 is provided separate from a media presentation device 204. As a result, the example system 200 may be used in situations in which the media presentation device 204 is incapable of implementing or otherwise does not implement the presentation monitor 202. For example, the system 200 of FIG. 2 may be used when the media presentation device 204 is not capable of a network connection to facilitate updating the status server 112 of the status of media presentation at the first location 102 and/or in other cases when a standalone meter or a meter in another home detection device is preferred.

In the example of FIG. 2, the presentation monitor 202 is implemented using a device separate from the media presentation device 204. For example, the presentation monitor 202 may include an audience measurement device (e.g., a meter provided by an audience measurement entity) located proximate to the media presentation device 204. The presentation monitor 202 of the illustrated example is provided with one or more media presentation detection mechanisms, such as a microphone to collect audio being presented, a hardware tap to identify (e.g., snoop) one or more electrical buses and/or signals from the media presentation device 204, an image sensor to detect video being presented, a probe or sensor to detect channel change events and/or identify tuned channels, and/or any other type of sensor or transducer.

When, based on one or more sensor and/or transducer inputs, the presentation monitor 202 of the illustrated example determines there is a sufficient likelihood that the media presentation device 204 is presenting media, the presentation monitor 202 sends a status update to the status server 112 indicating the status of the first location 102 (e.g., media being presented). The status update of the illustrated example identifies the first location, the media presentation device 204, the presentation monitor 202, the time of day, and/or the date at which media is presented. The example status server 112 of the illustrated example then provides the status to the example media collector 110 to determine whether the media collector 110 is to collect audio.

Figure 3:
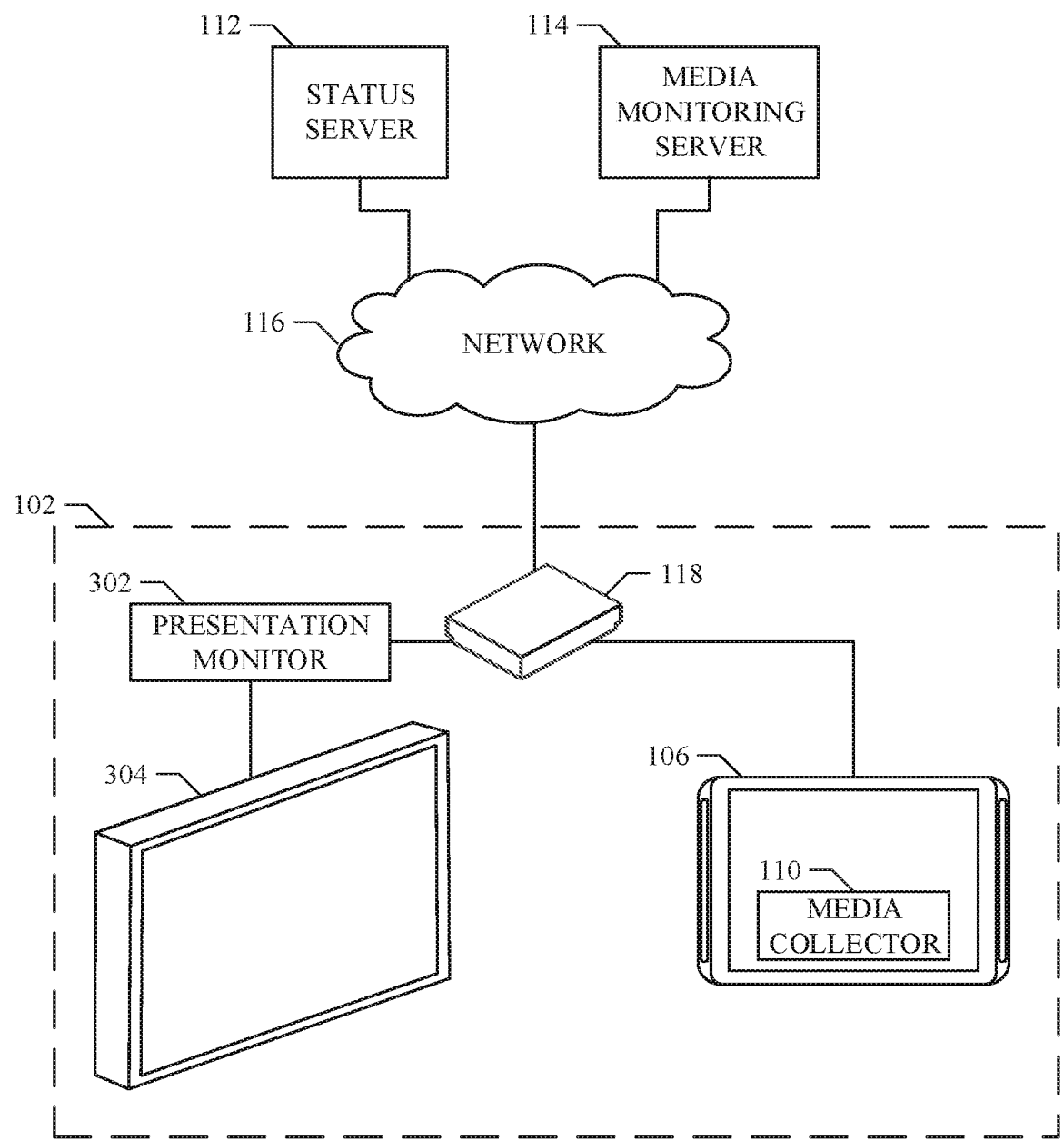
FIG. 3 illustrates another example system constructed in accordance with the teachings of this disclosure to monitor media presentation, in which a presentation monitor is disposed between a media presentation device and a network.

FIG. 3 illustrates another example system 300 to monitor media presentation in accordance with the teachings of this disclosure. The example system 300 may be used to perform audience measurement by collecting audio being presented at the first location 102. The example of FIG. 3 includes the example first location 102, the example mobile device 106, the example media collector 110, the example status server 112, the example media monitoring server 114, the example network 116, and the example router 118 of FIG. 1. However, the example system 300 differs from the systems 100, 200 of FIGS. 1 and 2 in that a presentation monitor 302 is interposed between a media presentation device 304 and the network 116. As a result, the example system 300 may be used in situations in which the media presentation device 304 may communicate with a network (e.g., is an Internet-connected device) but does not or cannot implement the presentation monitor 302. For example, the system 300 of FIG. 3 may be used when the media presentation device 304 is capable of an Internet connection but deploying, developing, and/or implementing a presentation monitor within the media presentation device 304 is not practical or is otherwise disadvantageous or undesired.

The example presentation monitor 302 of FIG. 3 is communicatively coupled between the example media presentation device 304 and the network 116 (e.g., between the media presentation device 304 and the router 118). The example presentation monitor 302 of the illustrated example monitors and/or snoops incoming and/or outgoing data communications to the media presentation device 304. When the presentation monitor 302 of the illustrated example identifies communications to the media presentation device 304 that indicate a sufficient likelihood of media being presented, the presentation monitor 302 updates a status of the first location to the status server 112. The example status server 112 of the illustrated example then provides the status to the example media collector 110 to determine whether the media collector 110 is to collect audio.

While the example systems 100, 200, 300 of FIGS. 1-3 are described with reference to a first location 102, such as a household of a panelist associated with the mobile device 106, the systems 100, 200, 300 are not limited in the number of locations and/or devices that may be used and/or monitored. In some examples, the media collector 110 receives status updates for any locations at which the media collector 110 determines the mobile device 106 is located. For example, if the media collector 110 determines that the mobile device is at a second location associated with a commercial establishment, and the status server 112 has a status associated with the same location, the status server 112 of such examples provides a status update indicative of whether there is a sufficient likelihood of media presentation at the second location to the media collector 110 to begin, continue, or stop data collection as the case may be.

Figure 4:
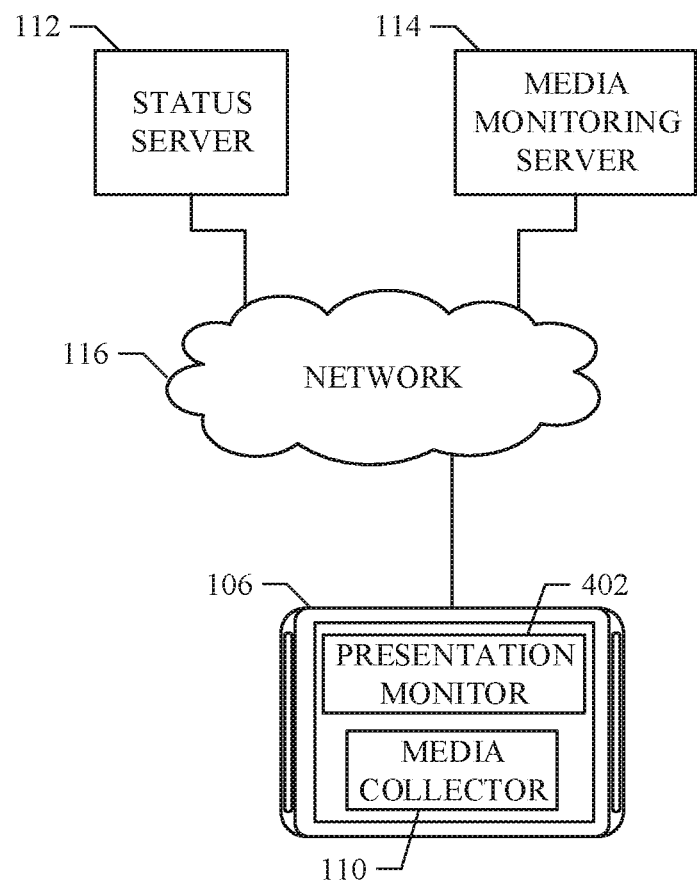
FIG. 4 illustrates another example system constructed in accordance with the teachings of this disclosure to monitor media presentation, in which a media presentation device includes both a presentation monitor and a media collector.

FIG. 4 illustrates another example system 400 to monitor media presentation in accordance with the teachings of this disclosure. In the example of FIG. 4, the mobile device 106 includes both the media collector 110 and a presentation monitor 402.

The example presentation monitor 402 of FIG. 4 monitors the mobile device 106 to determine a likelihood that media is being presented on the mobile device 106 and/or in the vicinity of the mobile device. For example, the presentation monitor 402 monitors applications operating on the mobile device 106, monitors incoming and/or outgoing data traffic at the mobile device 106, monitors an audio output device for audio being output, and/or otherwise monitors the mobile device 106 for an indication of media presentation on the device 106 or on another media presentation device near the mobile device 106. When the presentation monitor 402 determines that there is a likelihood that the mobile device 106 and/or another media presentation device in the vicinity of the mobile device 106 is presenting media, the presentation monitor 402 updates the corresponding status at the status server 112.

When the example media collector 110 receives a status update (e.g., from the status server 112, from the presentation monitor 402, etc.) indicating there is a sufficient likelihood of media being presented at the mobile device 106, the media collector 110 begins collecting audio from the mobile device 106. For example, the media collector 110 may access an audio output buffer or other source of audio data and/or may use a microphone present in the mobile device 106 to record the audio being played by the mobile device 106.

Figure 5A:
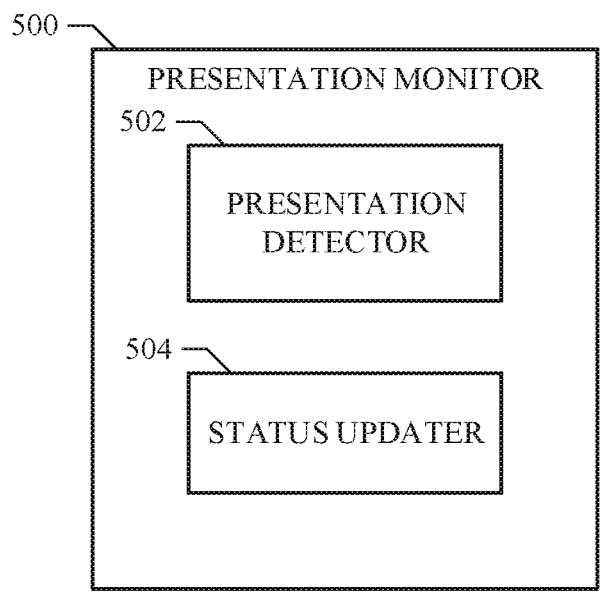
FIG. 5A is a block diagram of an example presentation monitor that may be used to implement any or all of the presentation monitors of FIGS. 1-4.

FIG. 5A is a block diagram of an example presentation monitor 500 that may be used to implement any of the presentation monitors 108, 202, 302, 402 of FIGS. 1-4. The presentation monitor 500 of the illustrated example may be implemented in a media presentation device (e.g., a TV, a computer, a tablet, a cellular phone, etc.), proximate to a media presentation device, between a media presentation device and a network, and/or on a mobile device (which may also be a media presentation device). The example presentation monitor 500 of FIG. 5 includes a presentation detector 502 and a status updater 504.

The example presentation detector 502 of FIG. 5A detects the start and/or the end of media presentations at a first location (e.g., the location 102 of FIG. 1). For example, where the presentation monitor 500 is included in a media presentation device (e.g., the media presentation device 104 of FIG. 1), the presentation detector 502 may identify network connections and/or data received from a network (e.g., the network 116 of FIG. 1), monitor an operating state of the media presentation device (e.g., an on state, a playing media state, a paused state, an off state, etc.), monitor user inputs (e.g., remote control or other user inputs), and/or otherwise determine a likelihood of media presentation at the first location.

Figure 5B:
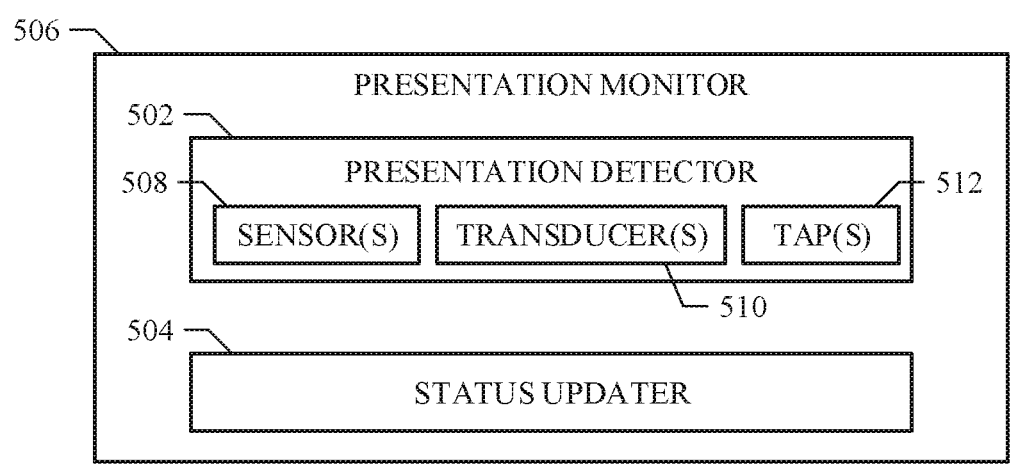
FIG. 5B is a block diagram of another example presentation monitor that may be used to implement any or all of the presentation monitors of FIGS. 1-4.

Another example presentation monitor 506 is shown in FIG. 5B. In the example of FIG. 5B, the presentation monitor 506 is provided external and proximate to a media presentation device (e.g., the media presentation device 204 of FIG. 2) at the first location 102. The example presentation monitor 506 includes one or more sensors 508, transducers 510, bus taps 512, and/or other input devices to determine whether media is being presented by the media presentation device.

Figure 5C:
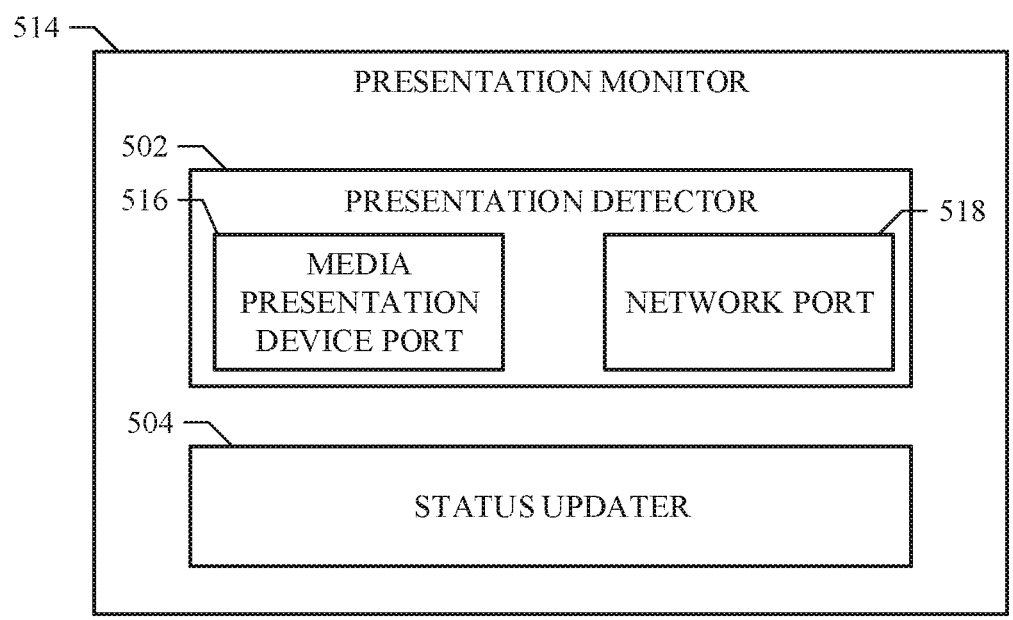
FIG. 5C is a block diagram of another example presentation monitor that may be used to implement any or all of the presentation monitors of FIGS. 1-4.

Another example presentation monitor 514 is shown in FIG. 5C. In the example of FIG. 5C, the presentation monitor 514 is provided between a media presentation device (e.g., the media presentation device 304 of FIG. 3) and a network (e.g., the network 116). The example presentation monitor 514 includes a media presentation device port 516 and a network port 518. The media presentation device port 516 communicatively couples the presentation detector 514 to the media presentation device. The network port 518 communicatively couples the presentation detector 514 to a network (e.g., the Internet) and to a status server. The example presentation detector 514 snoops data being transmitted between the media presentation device 304 and the network 116 to determine whether media is being presented by the media presentation device.

In some examples, the presentation detector 502 determines which media is being presented based on multiple factors. In some such examples, these factors are weighted according to their relative correlations to presentation of media. For example, a factor may weigh in favor of media being presented when the factor is present and weigh against media being presented when the factor is not present. A factor may weigh either in favor of or against media being presented when present (or absent) and have a reduced or no effect on a determination of whether media being presented when absent (or present). Some factors may be dispositive of whether media is being presented when present, absent, or both.

When the example presentation detector 502 determines that media is presented and previously media was not being presented, the example status updater 504 updates a status of the first location 102 at a status server (e.g., the status server 112). Conversely, when the example status updater 504 determines that media is not being presented and previously there was believed to be a likelihood of media being presented, the example status updater 504 updates a status of the first location 102 at the status server 112 to indicate that there is no likelihood. In some examples, the status updater 504 also sends an update to the status server 112 (e.g., a keep-alive update) when the determined status is the same as the most recent status. In some other examples, the status updater 504 does not send an update if the determined status is the same as the most recent status.

Figure 6:
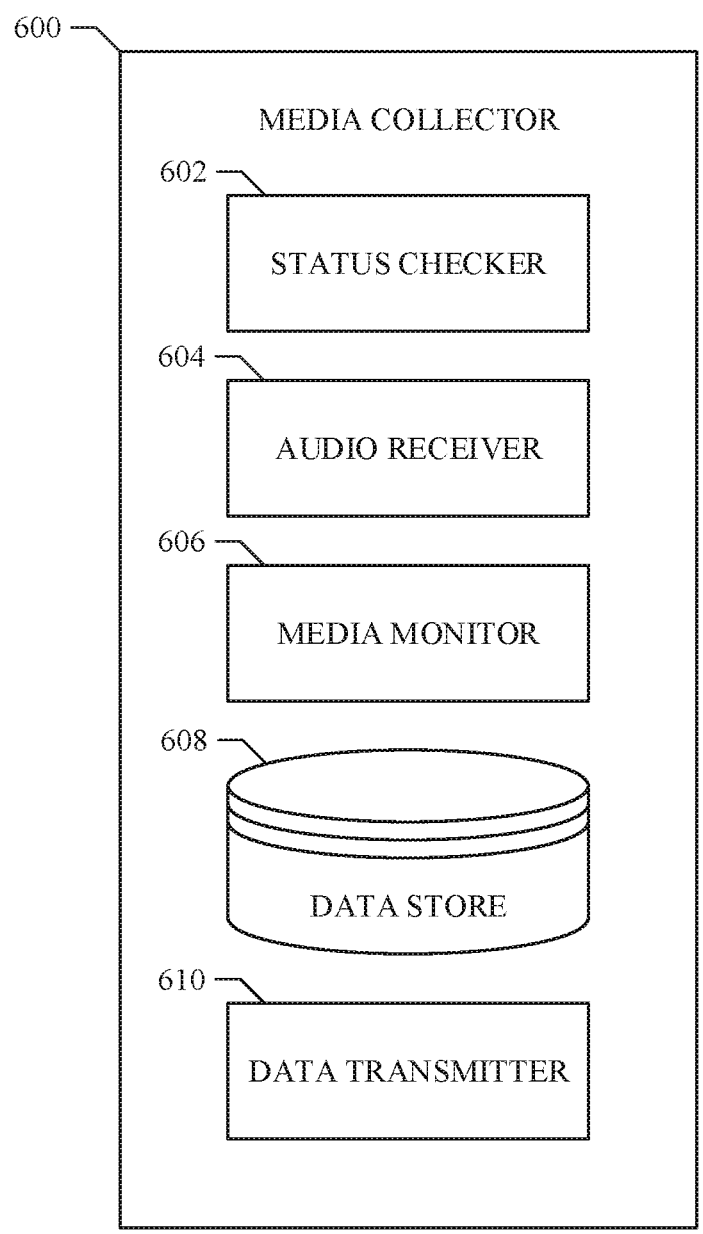
FIG. 6 is a block diagram of an example media collector that may be used to implement any or all of the media collectors of FIGS. 1-4.

FIG. 6 is a block diagram of an example media collector 600 that may be used to implement any or all of the media collectors 110 of FIGS. 1-4. The example media collector 600 of FIG. 6 may be used to collect audio being presented via a media presentation device (e.g., the media presentation devices 104, 204, 304, of FIGS. 1-3 and/or the mobile device 106 of FIG. 4) when a status indicates that there is a likelihood of media being presented. In some examples, the media collector 600 is implemented in a mobile device 106 using software, firmware, and/or hardware. The example media collector 600 includes a status checker 602, an audio receiver 604, a media monitor 606, a data store 608, and a data transmitter 610.

The status checker 602 of the illustrated example receives a status of media presentation of one or more monitored location(s) (and/or device(s)). For example, the status checker 602 (and/or the mobile device 106) may be associated with a first location (e.g., the first location 102 of FIGS. 1-4) such as a panelist household. The status checker 602 receives the status (e.g., periodically, aperiodically, at particular times, substantially continuously, and/or in response to one or more events such as entry to the monitored location as determined by GPS) of media presentation at the first location. In the illustrated example, the status may include a simple Boolean status (e.g., there is a sufficient likelihood of media presentation, there is not a sufficient likelihood of media presentation). In some other examples, the status may include a quantified likelihood (e.g., a percentage chance of media presentation). In these examples, the status checker 602 compares the quantified likelihood to a threshold to determine whether there is an appropriate likelihood of media presentation at the first location 102 to justify beginning (or ending) audio collection.

When the status checker 602 of the illustrated example determines that there is a sufficient likelihood of media being presented, the example audio receiver 604 of FIG. 6 collects audio. For example, the audio receiver 604 of the illustrated example enables a microphone of a mobile device 106 to collect ambient audio in the vicinity of the mobile device 106. In some other examples (e.g., where the media collector is implemented in the media presentation device), the audio receiver 604 may access an audio stream, an audio output buffer, and/or any other source of audio information within the media presentation device. The example audio receiver 604 of the illustrated example stores the collected audio and/or a representation thereof in the data store 608 in compressed and/or uncompressed format(s).

In some examples, the audio receiver 604 provides the collected audio to the media monitor 606. The example media monitor 606 of FIG. 6 may receive the collected audio from the audio receiver 604 and/or may access stored audio from the data store 608. The media monitor 606 of the illustrated example identifies media (e.g., content or advertisements) represented by the collected audio. For example, the media monitor 606 may identify media by collecting codes and/or by generating signatures and/or hashes of the audio for comparison to known signatures and/or hashes. In some other examples, the media monitor 606 does not identify media, but identifies codes within the captured audio to confirm that the captured audio is due to a media presentation.

The example data store 608 of FIG. 6 stores collected audio and/or media identifications. In some examples, the data store 608 includes one or both of volatile and/or non-volatile memory. For example, the data store 608 may be implemented within a memory unit of a mobile device (e.g., in solid-state storage).

The example data transmitter 610 of FIG. 6 transmits collected audio data (and/or a representation thereof) and/or identifications of media based on collected audio. For example, the data transmitter 610 of the illustrated example transmits the collected audio to the media monitoring server 114 via the network 116 of FIGS. 1-4. In some examples, the data transmitter 610 transmits the data when a threshold amount of collected audio has been stored in the data store 608. In other examples, the data transmitter 610 transmits the data at particular times of day, in response to an event (e.g., when the mobile device is being charged), substantially continuously (e.g., when the audio is received), and/or on request (e.g., from the media monitoring server 114).

Figure 7:
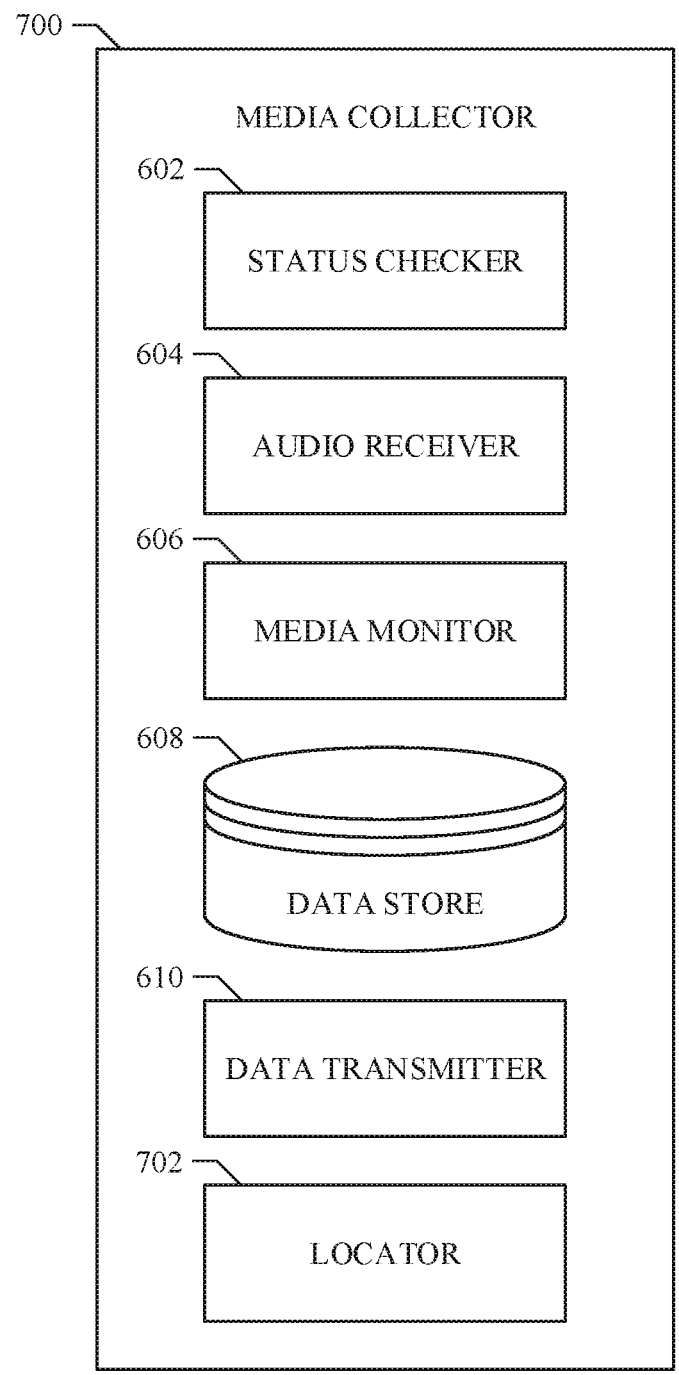
FIG. 7 is a block diagram of another example media collector including a locator that may be used to implement any or all of the media collectors of FIGS. 1-4.

FIG. 7 is a block diagram of another example media collector 700 that may be used to implement any or all of the media collectors 110 of FIGS. 1-4. The example media collector 700 of FIG. 7 includes the status checker 602, the audio receiver 604, the media monitor 606, the data store 608, and the data transmitter 610 of FIG. 6. Additionally, the example media collector 700 of FIG. 7 includes a locator 702. Like the media collector 600 of FIG. 6, the example media collector 700 may be implemented in a mobile device such as the mobile device(s) 106 of FIGS. 1-4.

The locator 702 determines a location of a mobile device 106 in which the media collector 700 is implemented. For example, the locator 702 may include or access a GPS sensor to determine a location of the mobile device 106. The position may additionally or alternatively be determined using cellular and/or WiFi access point triangulation. In some examples, the locator 702 determines whether the mobile device 106 is in the first location 102 based on the mobile device 106 being connected to a wireless LAN (e.g., a WiFi router) that is broadcasting in the first location 102.

When the example locator 702 determines that the mobile device 106 is in a location to be monitored (e.g., the first location, a public location, etc.), the locator 702 notifies the status checker 602. The detection of whether the device 106 is in a location to be monitored may be made, for example, by consulting a list of places identified as having media presentation devices (e.g., the panelist's home, restaurants, bars, etc.) The list may be maintained by the mobile device 106 and may be updated based on user input, historical behavior, developed during a calibration period (e.g., a first month of monitoring, etc.), etc. The example status checker 602 of FIG. 7 requests or polls the status server 112 for the status of media presentation for the location identified by the locator 702. In other examples, the locator 702 exports the determined location to the status server which maintains a master list of locations to be monitored.

By using the locator 702, the example media collector 700 of FIG. 7 can more accurately determine when to check the status of a location, while still conserving battery life of a mobile device. Furthermore, by identifying the location of the mobile device 106 and checking a status based on the location, the example locator 702 improves the monitoring of multiple locations while increasing the battery life of a mobile device.

Figure 8:
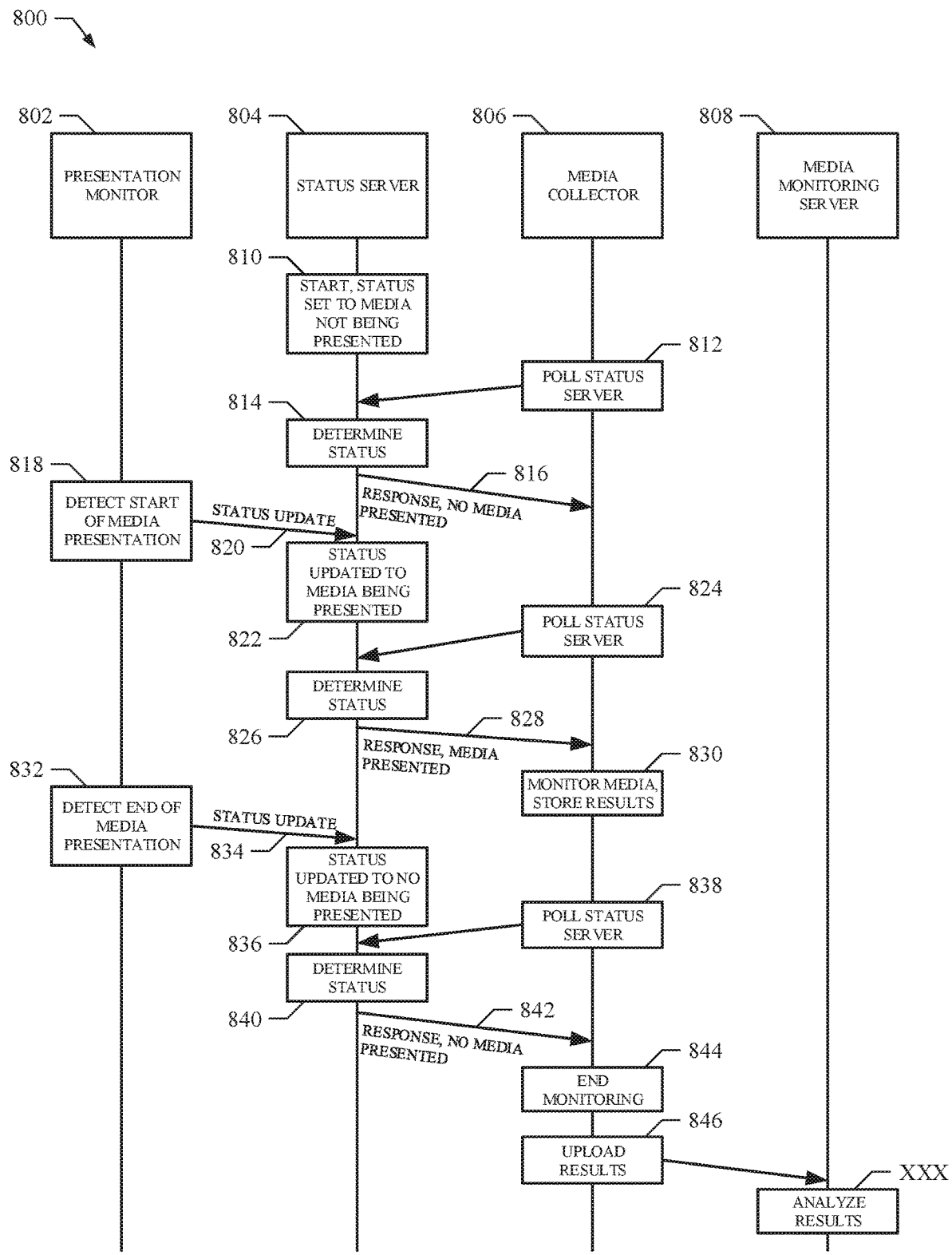
FIG. 8 is a flowchart illustrating example communication flows in the systems of FIGS. 1-4 to monitor media presentations.

FIG. 8 is a flowchart 800 illustrating example communication flows in any or all of the systems 100, 200, 300, 400 of FIGS. 1-4 to monitor media presentations. The example flowchart 800 includes communications occurring between one or more of a presentation monitor 802 (e.g., any of the presentation monitors 108, 202, 302, 402 of FIGS. 1-4), a status server 804 (e.g., the status server 112 of FIGS. 1-4), a media collector 806 (e.g., the media collector 110 of FIGS. 1-4), and a media monitoring server 808 (e.g., the media monitoring server 114 of FIGS. 1-4). For clarity of discussion, the example flowchart 800 will be described with reference to a single media presentation location (e.g., the first location 102 of FIG. 1) associated with the presentation monitor 802 and the media collector 806. However, the flowchart 800 may be modified to be used with multiple locations, multiple presentation monitors, and/or multiple media collectors.

The example flowchart 800 of FIG. 8 begins by starting the status server 804 (block 810). When the status server 804 is started, the status server 804 sets a status (e.g., a media presentation status or likelihood for the first location) to "media not being presented" (e.g., less than a threshold (e.g., zero or no) likelihood of media being presented). At a time after the status server 804 is started, the example media collector 806 polls the status server 804 (block 812). For example, the media collector 806 may send a status request identifying one or more locations of which the status is requested.

Based on the request or poll, the status server 804 determines the requested status (block 814). In the illustrated example, the status server 804 determines that the first location does not have a sufficient likelihood of media being presented. In some examples, the likelihood is based on data currently collected by the presentation monitor. In other examples, the likelihood is based on historical patterns reflecting media exposure by location and time of day. This historical data may be collected during an initial calibration period when media exposure data is always collected (at the expense of battery life) to develop the historical pattern(s) for the corresponding user(s). In some examples, the historical data is adjusted over time (e.g., after the calibration process) based on data collected by the presentation monitor.

Referring to the example of FIG. 8, because the status server 804 determines that there is not a sufficient likelihood of media being presented, the status server 804 transmits to the media collector 806 a response message 816 indicating that media is not being presented.

At some time after the status server starts (block 810), the example presentation monitor 802 detects a start of a media presentation (block 818). Based on the detection, the example presentation monitor 802 transmits a status update message 820 to the status server 804. The example update message 820 of the illustrated example includes an identification of the first location and the updated status (e.g., a sufficient likelihood of media being presented). The status server 804 receives the update message 820 and updates a status of the first location to reflect a sufficient likelihood of media being presented (block 822).

At a time after the status server 804 updates the status (block 822), the status server 804 may push a status update to the corresponding media collector 806 and/or the example media collector 806 may again poll the status server 804 for a status of media presentation (block 824). In response, the status server 804 determines the requested status (block 826) and transmits a response message 828 indicating that there is a sufficient likelihood of media being presented. The example polling (block 824), determination of status (block 826), and response message 828 may be performed in a similar or identical manner to respective blocks 812, 814 and message 816. When the media collector 806 receives the response message 828 indicating that media is being presented, the example media collector 806 monitors media (e.g., collects audio) and stores results of the monitoring (e.g., stores audio, stores identifications of media based on the audio, stores codes, stores signatures, etc.) (block 830).

At some time after detecting the start of the media presentation (block 818), the example presentation monitor 802 detects an end of the media presentation (e.g., there is no longer a likelihood of media being presented) (block 832). In such circumstances, the example presentation monitor 802 sends to the status server 804 a status update message 834 indicating the change in status. The status server 804 updates a status for the first location based on the status update message 834 to indicate no likelihood of media being presented (block 836). In some examples, the presentation monitor 802 does not detect the end of the media presentation (block 832) and/or does not transmit the status update message 834. In such an example, the status update message 820 indicating the start of a media presentation may be the only status message transmitted to the status server 804 with respect to a given presentation. In such an example, the status update message 820 expires after a threshold amount of time (e.g., five minutes, ten minutes, thirty minutes, one hour, etc.). In some examples, the presentation monitor 802 transmits an additional status update message indicating that media is still being presented. In such an example, the threshold amount of time may be increased such that the status update message 820 does not expire (e.g., there remains a sufficient likelihood of media being presented for an additional period of time). Additionally or alternatively, an expiration timer (e.g., a timer since the last status update message indicating that media is presented) may be reset to indicate that there remains a sufficient likelihood of media being presented until the expiration of the timer. In some examples, the additional status update message is transmitted from the presentation monitor 802 prior to the threshold amount of time (e.g., prior to the expiration of the status update message 820).

At a time after the status server 804 updates the status to indicate no (or an insufficient) likelihood of media being presented (block 836), the example media collector 806 may again poll the status server 804 for a status of media presentation (block 838). In response, the status server 804 determines the requested status (block 840) and transmits a response message 842 indicating that there is no likelihood of media being presented. The example polling (block 838), determination of status (block 840), and response message 842 may be performed in a similar or identical manner to respective blocks 812, 814 and message 816. When the media collector 806 receives the response message 842 indicating that media is not being presented, the example media collector 806 stops monitoring media (e.g., stops collecting audio) (block 844).

The example media collector 806 uploads results of monitoring to the media monitoring server 808 (block 846). The example upload may include collected audio, representations of collected audio, codes, signatures, timestamps, and/or identifications of media based on the collected audio. The example media monitoring server 808 analyzes the results based on the upload (block 848). The analysis may include, for example, performing audience measurement and/or media identification based on the collected audio and/or identifications provided by the media collector 806.

In some examples, the status server 804 is omitted and/or selectively employed. In such examples, the presentation monitor 802 and the media collector 806 directly communicate with each other. When, for example, direct communication between the presentation monitor 802 and the media collector 806 is not possible (e.g., when the presentation monitor 802 and the media collector 806 are in separate locations), the status server 804 may be selectively included to, for example, enable status updates to be communicated to the media collector 806. When direct communication between the presentation monitor 802 and the media collector 806 is possible, the status server 806 may be cut out of the communication or only updated for historical purposes. When direct communication is possible, the media collector 806 may start and/or stop collecting based on communications received directly from the presentation monitor 802.

While example manners of implementing the presentation monitors 108, 202, 302, 402, the media collectors 110, and/or the mobile devices 106 of FIGS. 1-4 have been illustrated in FIGS. 5A-5C, 6, and 7, one or more of the elements, processes and/or devices illustrated in FIGS. 5A-5C, 6, and 7 may be combined, divided, re-arranged, omitted, eliminated and/or implemented in any other way. Further, the example presentation detectors 502, the example status updaters 504, the example sensors 506, the example transducers 508, the example media presentation device port 510, the example network port 512, the example status checkers 602, the example audio receivers 604, the example media monitors 606, the example data stores 608, the example data transmitters 610, the example locator 702 and/or, more generally, the example presentation monitors 108, 202, 302, 402, the example media collectors 110, and/or the example mobile devices 106 of FIGS. 1-4 may be implemented by hardware, software, firmware and/or any combination of hardware, software and/or firmware. Thus, for example, any of the example presentation detectors 502, the example status updaters 504, the example sensors 506, the example transducers 508, the example media presentation device port 510, the example network port 512, the example status checkers 602, the example audio receivers 604, the example media monitors 606, the example data stores 608, the example data transmitters 610, the example locator 702 and/or, more generally, the example presentation monitors 108, 202, 302, 402, the example media collectors 110, and/or the example mobile devices 106 of FIGS. 1-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example presentation detectors 502, the example status updaters 504, the example sensors 506, the example transducers 508, the example media presentation device port 510, the example network port 512, the example status checkers 602, the example audio receivers 604, the example media monitors 606, the example data stores 608, the example data transmitters 610, the example locator 702, the example presentation monitors 108, 202, 302, 402, the example media collectors 110, and/or the example mobile devices 106 of FIGS. 1-4 are hereby expressly defined to include a tangible machine readable storage medium such as a memory, DVD, CD, Blu-ray, etc. storing the software and/or firmware. Further still, the example the example presentation monitors 108, 202, 302, 402, the example media collectors 110, and/or the example mobile devices 106 of FIGS. 1-4 may include one or more elements, processes and/or devices in addition to, or instead of, those illustrated in FIG. 4, and/or may include more than one of any or all of the illustrated elements, processes and devices.

Flowcharts representative of example machine readable instructions for implementing the presentation monitors 108, 202, 302, 402, the media collectors 110, and/or the mobile devices 106 of FIGS. 1-4 are shown in FIGS. 9A-12. In this example, the machine readable instructions comprise one or more programs for execution by one or more processors such as the processor 1312 shown in the example processor platform 1300 discussed below in connection with FIG. 13. The programs may be embodied in software stored on a tangible machine readable storage medium such as a CD-ROM, a floppy disk, a hard drive, a digital versatile disk (DVD), a Blu-ray disk, or a memory associated with the processor 1312, but the entire programs and/or parts thereof could alternatively be executed by device(s) other than the processor 1312 and/or embodied in firmware or dedicated hardware. Further, although the example programs are described with reference to the flowcharts illustrated in FIGS. 9A-12, many other methods of implementing the example presentation monitors 108, 202, 302, 402, the example media collectors 110, and/or the example mobile devices 106 of FIGS. 1-4 may alternatively be used. For example, the order of execution of the blocks may be changed, and/or some of the blocks described may be changed, eliminated, or combined.

As mentioned above, the example processes of FIGS. 9A-12 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 9A-12 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 9A:
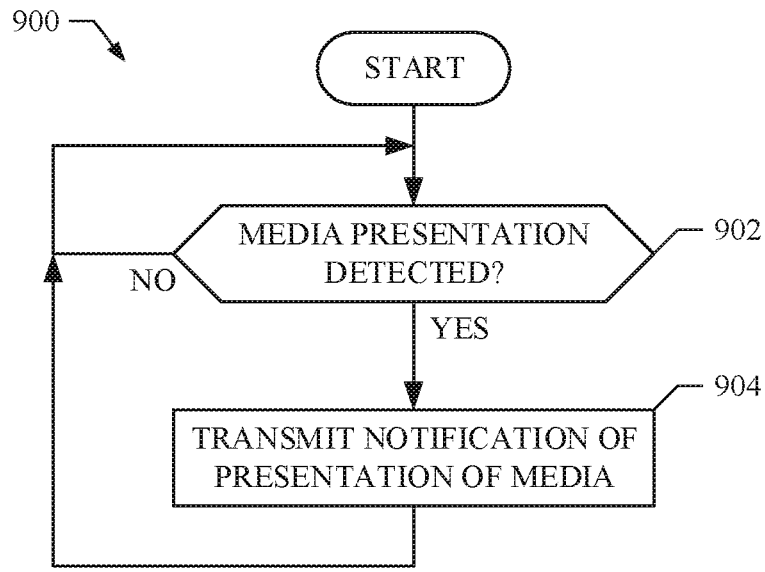
FIG. 9A is a flowchart representative of example machine readable instructions which, when executed, cause a processor to transmit a notification of media presentation.

FIG. 9A is a flowchart representative of example machine readable instructions 900 which, when executed, cause a processor to transmit a notification of media presentation. The example instructions 900 of FIG. 9 may be used to implement the presentation monitors 108, 202, 302, 402 of FIGS. 1-4, the presentation detectors 502 of FIGS. 5A-5C, and/or the status updaters 504 of FIGS. 5A-5C.

The example presentation detector 502 determines whether a media presentation is detected (block 902). For example, the presentation detector 502 may detect media presentation by detecting network connections and/or data received from a network (e.g., the network 116 of FIG. 1) at a media presentation device (e.g., the media presentation devices 104, 204, 304 of FIGS. 1-3), by monitoring an operating state of the media presentation device 104, 204, 304 (e.g., an on state, a playing media state, a paused state, an off state, etc.), by monitoring user inputs (e.g., remote control or other user inputs), by monitoring one or more sensors (e.g., the sensor(s) 506 and/or the transducer(s) 508 of FIG. 5B), by snooping data being transmitted to and/or from the media presentation device 104, 204, 304 and/or the network 116, and/or using any other method to determine whether media likely is being presented. If a media presentation is not detected (block 902), control loops to block 902 to continue monitoring for a media presentation.

If a media presentation is detected (block 902), the example status updater 504 transmits a notification (e.g., a status update) of a presentation of media (block 904). For example, the status updater 504 may send an update message (e.g., the status update message 820 of FIG. 8) to a status server (e.g., the status server 112 of FIGS. 1-4 and/or the status server 804 of FIG. 8) indicating a likelihood that media is being presented.

In the example of FIG. 9A, control loops to block 902 to continue monitoring for presentation of media. In some such examples, the presentation monitor 500 sends repeated status updates to the status server 112. These status updates confirm that there is a continuing likelihood that the media presentation device is presenting media. In some other examples, the instructions 900 may end after transmitting the notification (block 904) and transfer control to the instructions 906 of FIG. 9B to determine an end of media being presented.

Figure 9B:
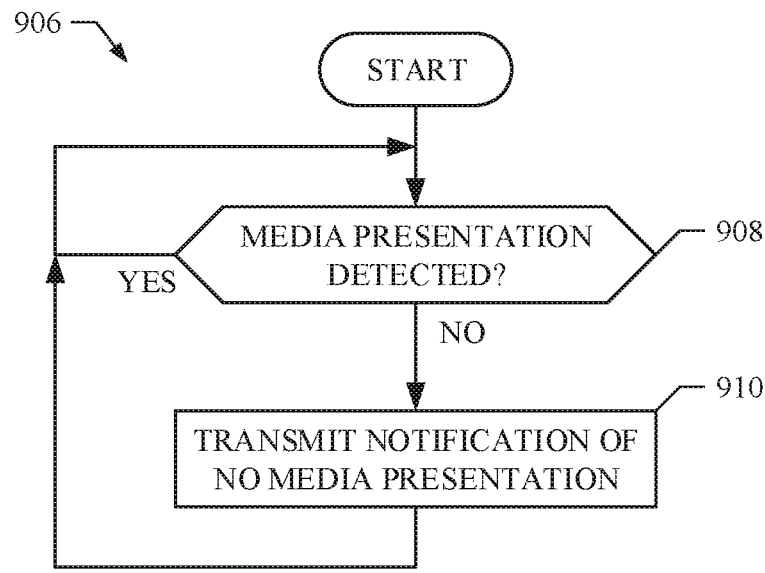
FIG. 9B is a flowchart representative of example machine readable instructions which, when executed, cause a processor to transmit a notification of media not being presented.

FIG. 9B is a flowchart representative of example machine readable instructions 906 which, when executed, cause a processor to transmit a notification that media is not currently being presented. The example instructions 906 of FIG. 9 may be used to implement the presentation monitors 108, 202, 302, 402 of FIGS. 1-4, the presentation detectors 502 of FIGS. 5A-5C, and/or the status updaters 504 of FIGS. 5A-5C. In some examples, the instructions 906 are used in combination with the example instructions 900 of FIG. 9A to update a status of media presentation at a status server.

The example instructions 900 begin with a status (e.g., at a status server) of a monitored location indicating a likelihood of media being presented. The example presentation detector 502 determines whether a media presentation is detected (block 908). For example, the presentation detector 502 may detect that media is not being presented by failing to detect that audio is being output by the media presentation device, detecting that the presentation device is in an off state, etc. If a media presentation is detected (block 908), control loops to block 902 to continue monitoring for a media presentation.

If a media presentation is not detected (block 908), the example status updater 504 transmits a notification (e.g., a status update) that media is not being presented (block 910). For example, the status updater 504 may send an update message (e.g., the status update message 834 of FIG. 8) to a status server (e.g., the status server 112 of FIGS. 1-4 and/or the status server 804 of FIG. 8) indicating that there is not a likelihood that media is being presented.

In the example of FIG. 9B, control loops to block 902 to continue monitoring for presentation of media. In some other examples, the instructions 900 may end after transmitting the notification (block 904) and transfer control to the instructions 906 of FIG. 9B. In some examples, the instructions represented by FIGS. 9A and 9B are combined into one processor flow (e.g., blocks 902 and 908 are combined and control proceeds to block 904 is media is detected and to block 910 if media is not detected).

Figure 10:
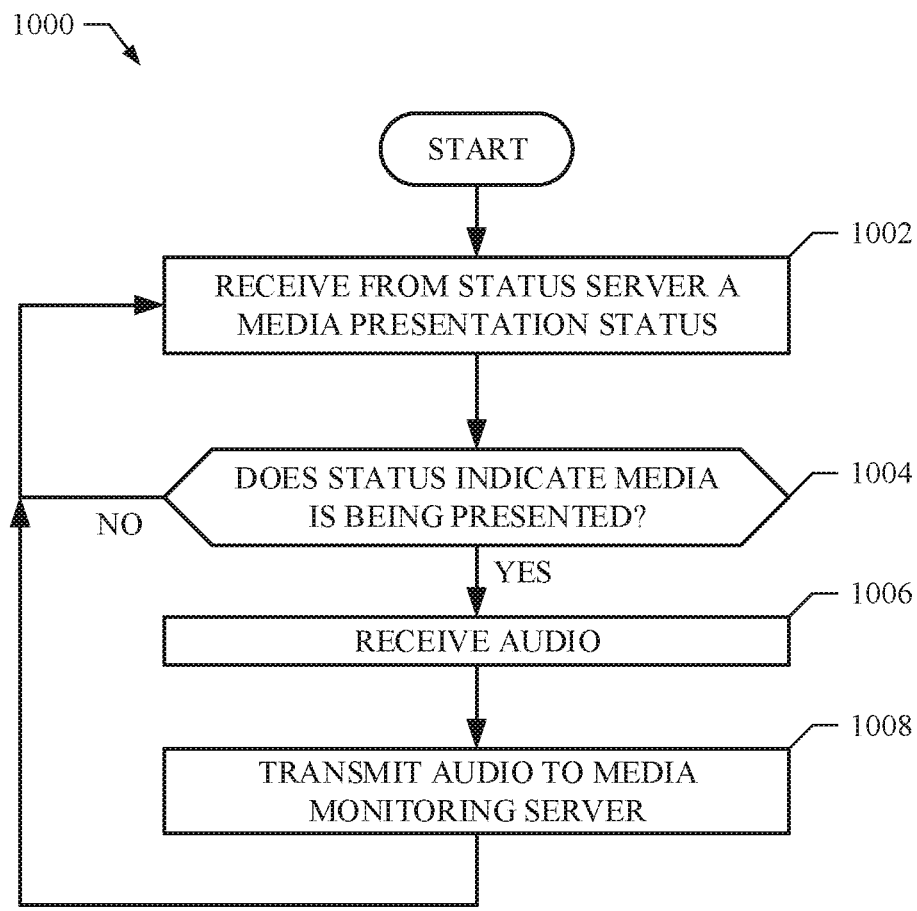
FIG. 10 is a flowchart representative of example machine readable instructions which, when executed, cause a processor to monitor audio.

FIG. 10 is a flowchart representative of example machine readable instructions which, when executed, cause a processor to monitor audio. The example instructions 1000 of FIG. 10 may be used to implement a media collector (e.g., the media collector 110 of FIGS. 1-4, the media collector 600 of FIG. 6, and/or the media collector 700 of FIG. 7).

A status checker (e.g., the status checker 602 of FIGS. 6 and 7) receives from a status server (e.g., the status server 112 of FIGS. 1-4) a media presentation status (block 1002). The media presentation status indicates media is being presented (or is likely being presented) at a first location (e.g., the first location 102 of FIGS. 1-3, a panelist household, etc.). In some examples, the status checker 602 polls (e.g., requests the status from) the status server 112. In some examples, the status server 112 additionally or alternatively provides the status to the status checker 602 without a prior request from the status checker 602.

The example status checker 602 determines whether the status message indicates a likelihood that media is being presented (block 1004). For example, the status checker 602 may receive a Boolean status indicating that there is a likelihood or there is not a likelihood. In some other examples, the status checker 602 checks a likelihood against a threshold. If the status indicates there is not a likelihood of media being presented (block 1004), control returns to block 1002 to await another status.

On the other hand, if the status indicates that media is being presented (block 1004), an audio receiver (e.g., the audio receiver 604 of FIGS. 6 and 7) is installed to receive or collect audio (block 1006). For example, the audio receiver 604 may enable a microphone and store (e.g., in the data store 608 of FIGS. 6 and 7) any audio captured by the microphone (and/or representations of the audio). A data transmitter (e.g., the data transmitter 610 of FIGS. 6 and 7) transmits the audio to a media monitoring server (e.g., the media monitoring server 114 of FIGS. 1-4) (block 1008). In the example of FIG. 10, control returns to block 1002 to receive a media presentation status. In some other examples, control may loop to block 1006 to continue receiving and/or transmitting audio until a media presentation status is received indicating there is no longer a likelihood of media being presented and/or until a status indicating the likelihood of media being presented expires.

Figure 11:
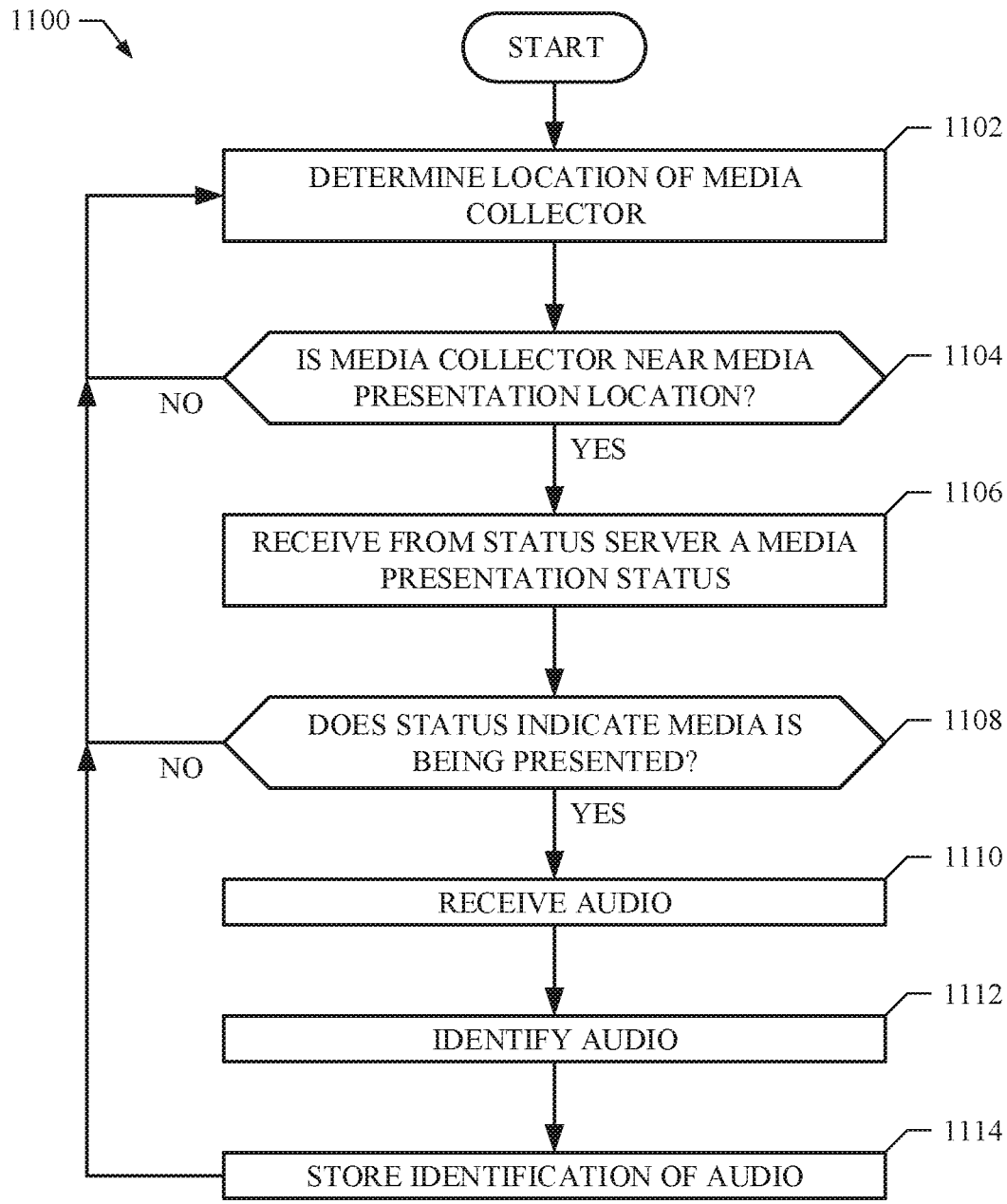
FIG. 11 is a flowchart representative of example machine readable instructions which, when executed, cause a processor to monitor audio.

FIG. 11 is a flowchart representative of example machine readable instructions 1100 which, when executed, cause a processor to monitor audio. The example instructions 1100 of FIG. 11 may be used to implement a media collector including a locator (e.g., the media collector 110 of FIGS. 1-4 and/or the media collector 700 of FIG. 7).

A locator (e.g., the locator 702 of FIG. 7) determines a location of a media collector (e.g., the mobile device 106 and/or the media collector 110 of FIGS. 1-4, the media collector 700 of FIG. 7) (block 1102). For example, the locator 702 may include or access a Global Positioning System (GPS) sensor to determine a location of the mobile device 106. The position may additionally or alternatively be determined using cellular and/or WiFi access point triangulation. The locator 702 determines whether the media collector 700 is near a known media presentation location (block 1104). For example, the locator 702 may determine whether the mobile device 106 is located in substantially the same location as (e.g., proximate to, within audio range of) the first location 102 where a media presentation device (e.g., the media presentation devices 104, 204, 304 of FIGS. 1-3) is known to be located. If the media collector 700 is not near a known media presentation location (block 1104), control returns to block 1102 to determine the location of the media collector. In some examples, the return to block 1102 from block 1104 includes a delay to reduce a battery drain from repeated determinations of location.

If the locator 702 determines that the media collector 700 is near the media presentation location (block 1104), the status checker 602 receives from a status server (e.g., the status server 112 of FIGS. 1-4) a media presentation status (block 1106). The media presentation status indicates whether there is a likelihood of media being presented at the present media presentation location. In some examples, the status checker 602 polls (e.g., requests the status from) the status server 112. In some other examples, the status server 112 provides the status to the status checker 602 without a prior request from the status checker 602.

The example status checker 602 determines whether the status indicates a likelihood that media is being presented (block 1108). For example, the status checker 602 may receive a Boolean status indicating that there is a sufficient likelihood or there is not a sufficient likelihood. In some other examples, the status checker 602 checks a received likelihood against a threshold. If the status indicates there is not a sufficient likelihood of media being presented (block 1108), control returns to block 1102 to determine a location of the media collector 700.

On the other hand, if the status indicates that media is (or is likely) being presented (block 1108), an audio receiver (e.g., the audio receiver 604 of FIG. 7) receives or collects audio (block 1110). For example, the audio receiver 604 may enable a microphone and store (e.g., in the data store 608 of FIG. 7) any audio (or codes and/or signatures) captured by the microphone. A media monitor (e.g., the media monitor 606 of FIG. 7) identifies the audio (block 1112). For example, the media monitor 606 may identify one or more codes in the audio and/or may generate one or more signature(s) and/or hash(es) of the audio to facilitate recognition of the media.

The example media monitor 606 stores the identification of the audio (e.g., in the data store 608 of FIG. 7) (block 1114). Control then returns to block 1102 to determine the location of the media collector. In some examples, a data transmitter (e.g., the data transmitter 610 of FIG. 7) transmits the identification(s) to a media monitoring server. For example, the instructions 1100 of FIG. 11 may be used in combination with the instructions 1200 of FIG. 12 to collect media and transmit the media.

Figure 12:
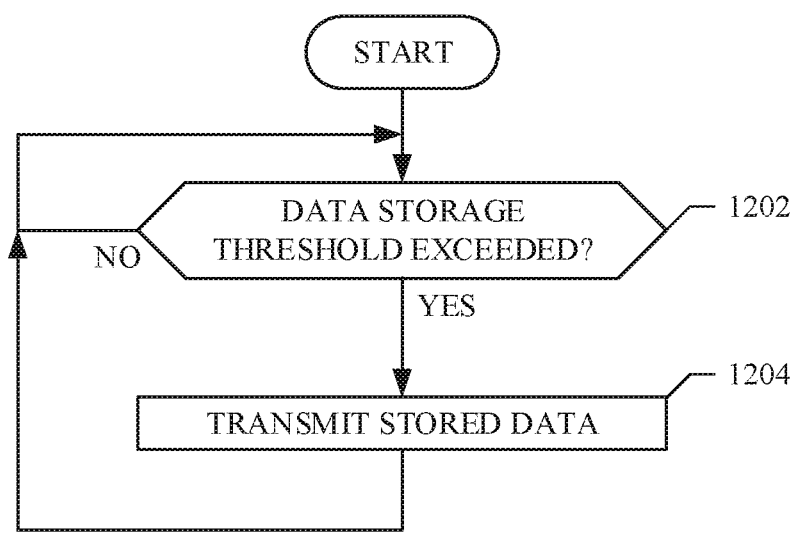
FIG. 12 is a flowchart representative of example machine readable instructions which, when executed, cause a processor to transmit stored data.

FIG. 12 is a flowchart representative of example machine readable instructions 1200 which, when executed, cause a processor to transmit stored data. The example instructions 1200 may be used to implement the example media collector 110 of FIGS. 1-4, the example media collector 600 of FIG. 6, and/or the example media collector 700 of FIG. 7. The example instructions 1200 of FIG. 12 may be used in combination with the example instructions 1000 of FIG. 10 and/or the example instructions 1100 of FIG. 11 to collect media and transmit the collected media to a media monitoring server (e.g., the media monitoring server 114 of FIGS. 1-4).

A data transmitter (e.g., the data transmitter 610 of FIGS. 6 and 7) determines whether a data storage threshold has been exceeded (block 1202). For example, the data transmitter 610 may determine whether more than a threshold portion of a data storage (e.g., the data storage 608 of FIGS. 6 and 7) assigned, reserved, or dedicated to storage of media collection has been exceeded. If the data storage threshold is not exceeded (block 1202), control returns to block 1202 to monitor data storage and again compare to the threshold. In some examples, the return of control to block 1202 includes a delay to provide additional time to store media collection data. The delay may vary with (e.g., be proportional to) the amount of data stored in the data storage.

If the data storage threshold has been exceeded (block 1204), the data transmitter 610 transmits stored data (e.g., to the media monitoring server 114 of FIGS. 1-4). In some examples, the data transmitter 610 transmits data that has not been previously transmitted to the media monitoring server 114. After transmitting the data, control returns to block 1202 to monitor the data storage with respect to the threshold.

Figure 13:
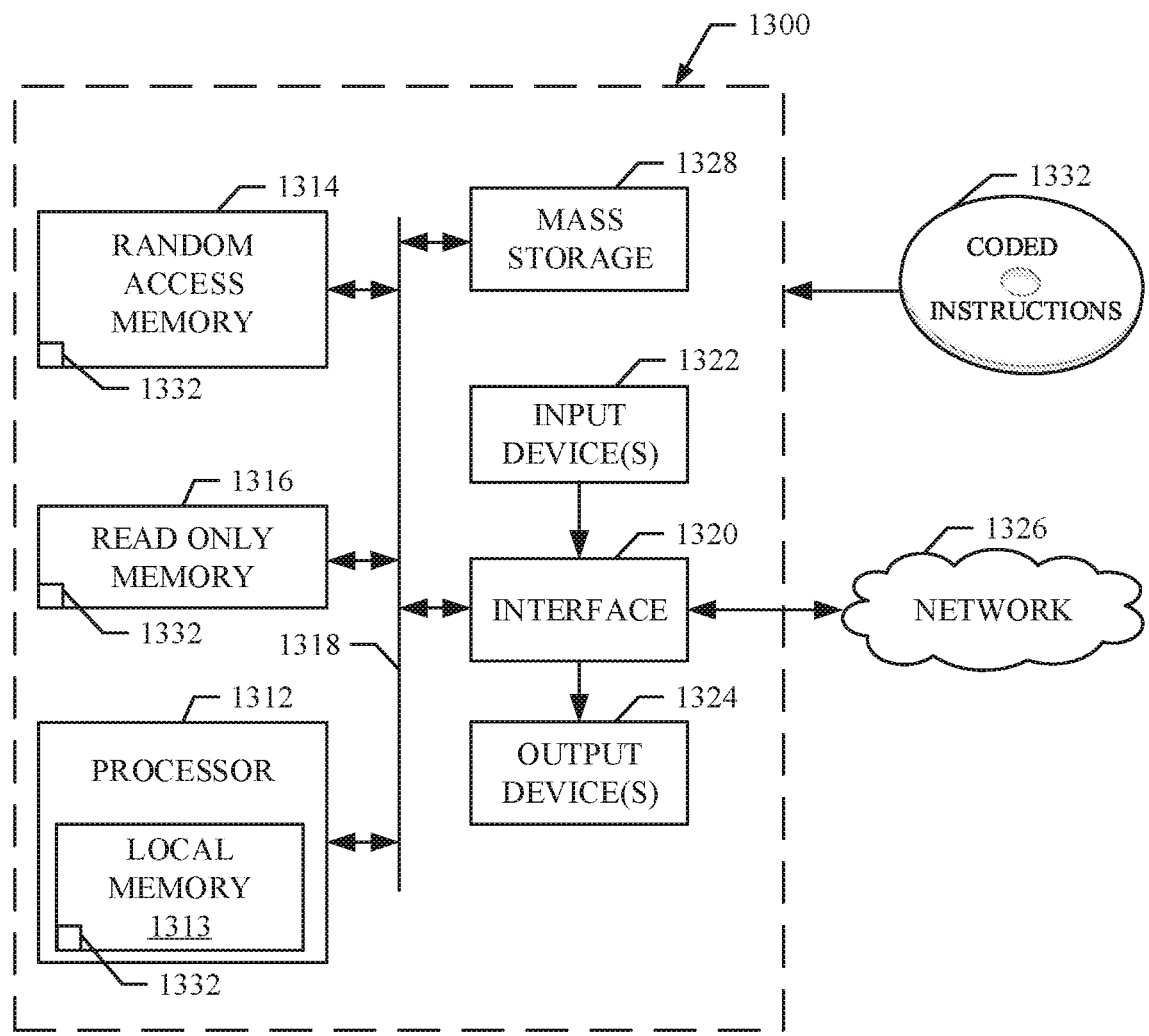
FIG. 13 is a block diagram of an example computer capable of executing the example instructions of FIGS. 9A-12 to implement the example presentation monitor of FIG. 5 and/or the example media collectors of FIGS. 6 and/or 7.

FIG. 13 is a block diagram of an example processor platform 1300 capable of executing the instructions 900, 906, 1000, 1100, 1200 of FIGS. 9A-12 to implement the example presentation detectors 502, the example status updaters 504, the example sensors 506, the example transducers 508, the example media presentation device port 510, the example network port 512, the example status checkers 602, the example audio receivers 604, the example media monitors 606, the example data stores 608, the example data transmitters 610, the example locator 702 and/or, more generally, the example presentation monitors 108, 202, 302, 402, the example media collectors 110, and/or the example mobile devices 106 of FIGS. 1-4. The processor platform 1300 can be, for example, a server, a personal computer, a mobile phone (e.g., a cell phone), a personal digital assistant (PDA), an Internet appliance, a personal media device, a DVD player, a CD player, a digital video recorder, a Blu-ray player, a gaming console, a personal video recorder, a set top box, or any other type of computing device.

The processor platform 1300 of the instant example includes a processor 1312. For example, the processor 1312 can be implemented by one or more microprocessors or controllers from any desired family or manufacturer.

The processor 1312 includes a local memory 1313 (e.g., a cache) and is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The computer 1300 also includes an interface circuit 1320. The interface circuit 1320 may be implemented by any type of interface standard, such as an Ethernet interface, a universal serial bus (USB), and/or a PCI express interface.

One or more input devices 1322 are connected to the interface circuit 1320. The input device(s) 1322 permit a user to enter data and commands into the processor 1312. The input device(s) can be implemented by, for example, a keyboard, a mouse, a touchscreen, a track-pad, a trackball, isopoint and/or a voice recognition system.

One or more output devices 1324 are also connected to the interface circuit 1320. The output devices 1324 can be implemented, for example, by display devices (e.g., a liquid crystal display, a cathode ray tube display (CRT), and/or speakers). The interface circuit 1320, thus, typically includes a graphics driver card.

The interface circuit 1320 also includes a communication device such as a modem or network interface card to facilitate exchange of data with external computers via a network 1326 (e.g., an Ethernet connection, a digital subscriber line (DSL), a telephone line, coaxial cable, a cellular telephone system, etc.) (e.g., the network 116 of FIGS. 1-4).

The computer 1300 also includes one or more mass storage devices 1328 for storing software and data. Examples of such mass storage devices 1328 include floppy disk drives, hard drive disks, compact disk drives and digital versatile disk (DVD) drives. The mass storage device 1328 may implement the data store 608 of FIGS. 6 and 7.

The coded instructions 1332 of FIGS. 9A-12 may be stored in the mass storage device 1328, in the volatile memory 1314, in the non-volatile memory 1316, in the local memory 1313, and/or on a removable storage medium such as a CD or DVD.

Disclosed methods, apparatus and machine-readable storage media improve monitoring of media presentation via a mobile device. Example methods, apparatus and machine-readable storage media disclosed herein increase the battery life of mobile devices used to monitor media by limiting the amount of audio or media collection the mobile device performs to instances or situations in which there is at least a threshold likelihood that media is being presented. The increase in battery performance resulting from disclosed example methods, apparatus and machine-readable storage media improves user (e.g., panelist) satisfaction and/or user (e.g., panelist) compliance with a monitoring program that uses mobile devices. The increased satisfaction may cause panelists to remain panelists for longer periods of time, thereby increasing resources of the audience measurement company.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A non-transitory computer readable medium comprising computer readable instructions which, when executed, cause a processor of a mobile device to at least:
   determine a location of a mobile device;
   compare the location of the mobile device with a set of predefined locations at which audio monitoring is to be performed;
   send a status request including a first location corresponding to a location of the mobile device to a media presentation status server in response to the location of the mobile device corresponding to one of the predefined locations, and to conserve a battery life of the mobile device, the status request is not sent when the location of the mobile device does not correspond to any of the set of predefined locations;
   receive, from the media presentation status server in response to the request including the first location, a status indicating whether a likelihood of media being presented at the first location satisfies a threshold, the status obtained at the media presentation status server from a presentation monitor, separate from the mobile device, associated with the first location;
   enable collection of audio with the mobile device when the status indicates that the likelihood of media being presented satisfies the threshold and the location of the mobile device corresponds to the first location; and
   disable collection of audio when the status indicates that the likelihood of media being presented does not satisfy the threshold and the location of the mobile device corresponds to the first location to conserve battery life of the mobile device.

2. The non-transitory computer readable medium as defined in claim 1, wherein the instructions further cause the processor to transmit audience measurement data based on the collected audio from the mobile device to a media monitoring server.

3. The non-transitory computer readable medium as defined in claim 1, wherein the instructions cause the processor to update the status in response to detection of media presented at the first location.

4. The non-transitory computer readable medium as defined in claim 1, wherein the instructions cause the processor means for sending polls the media presentation status server for the status when sending the status request.

5. The non-transitory computer readable medium as defined in claim 1, wherein the instructions further cause the processor to determine whether the likelihood of media being presented at the location of the mobile device satisfies the threshold.

6. The non-transitory computer readable medium as defined in claim 5, wherein the instructions cause the processor to collect audio is performed by a first application on the mobile device, and the means for determining of the location of the mobile device is performed by a second application on the mobile device, the second application being different than the first application.

7. The non-transitory computer readable medium as defined in claim 1, wherein the instructions further cause the processor to sense an input at the first location to determine the likelihood of the media being presented at the first location.

* * * * *